United States Patent [19]

Gant

[11] 4,064,027

[45] Dec. 20, 1977

[54] UV CURABLE COMPOSITION

[75] Inventor: George A. L. Gant, Midland, Mich.

[73] Assignee: Dow Corning Corporation, Midland, Mich.

[21] Appl. No.: 401,791

[22] Filed: Sept. 28, 1973

[51] Int. Cl.$^2$ .............................................. C08F 30/08
[52] U.S. Cl. ........................ 204/159.13; 260/46.5 UA; 260/46.5 G; 260/46.5 E
[58] Field of Search ................................... 204/159.13; 260/46.5 UA, 46.5 G, 46.5 E, 825

[56] References Cited

U.S. PATENT DOCUMENTS

| | | | |
|---|---|---|---|
| 3,535,145 | 10/1970 | Gowdy et al. | 260/46.5 E |
| 3,546,156 | 12/1970 | Baronnier et al. | 260/46.5 UA |
| 3,816,282 | 6/1974 | Viventi | 260/46.5 E |

OTHER PUBLICATIONS

Webster's New World Dictionary of the American Language, 2nd College Edition, pp. 1564, 581, and 4, (1970).

Primary Examiner—Lewis T. Jacobs
Attorney, Agent, or Firm—Jack E. Moermond

[57] ABSTRACT

A composition curable upon exposure to ultraviolet light is disclosed which consists essentially of a vinyl-containing siloxane and siloxane-containing, silicon-bonded hydrogen atoms. A mercaptofunctional silicone can be employed in the composition as a cure accelerator. Another composition curable upon exposure to ultraviolet light which is disclosed consists essentially of a mercaptofunctional siloxane and a vinyl-containing siloxane.

16 Claims, No Drawings

UV CURABLE COMPOSITION

This invention relates to new compositions curable upon exposure to ultraviolet light.

In the silicone industry much effort is spent on attempts to find new systems which will solve pressing problems. For example, in the area of release coatings the emphasis in the past decade has been on finding compositions which can be cured faster and faster at lower and lower temperatures. However, the use of catalysts which give such results have led to problems in bath stability and unwanted side reactions, such as blocking. Furthermore, legislative action by many states has placed serious limitations on solvent-based systems because of ecological considerations.

While the use of ultraviolet ("U.V.") light to cure polymers is not per se new it has been discovered in accordance with this invention that certain unique compositions as hereinafter defined cannot only be cured by exposure to ultraviolet light but that they provide a means of meeting various objects and advantages long sought in the art. For example, by employing the compositions hereinafter defined and by curing them by exposure to ultraviolet light it is found that the reaction can be carried out without the necessity of heating the composition whereas similar compositions heretofore known generally require a fair degree of heating to achieve cure within a reasonable time. There is no catalyst required with the compositions of the instant invention and hence the resulting product is not contaminated by catalyst residue. The compositions can be employed neat; that is, free of solvent and hence the problems encountered ecologically with heretofore known compositions can be avoided. It has been found that less space is required for the curing unit employing the compositions of the instant invention and hence this provides an additional savings. Finally, it has been found that the cost of curing is generally lower resulting in monetary savings.

The compositions hereinafter defined include such diverse compositions as fluids, resins and elastomers. These compositions find utility in such areas as release coatings, paints, electrical coatings such as for circuit boards, encapsulants for electrical components, lithographic coatings, photoresist coatings and fabric coatings.

One composition of this invention which is curable upon exposure to ultraviolet light consists essentially of (A) a siloxane consisting essentially from 0.5 to 100 mole percent of vinyl-containing siloxane units of the general formula $(CH_2=CH)R_nSiO_{3-n/2}$ wherein R is a monovalent hydrocarbon or monovalent halogenated hydrocarbon radical and $n$ has a value from 0-2, any nonvinyl containing siloxane units present having the general formula $R'_mSiO_{4-m/2}$ wherein R' is a monovalent hydrocarbon or monovalent halogenated hydrocarbon radical, $m$ has a value from 0-3, and (B) a siloxane containing at least one silicon-bonded hydrogen atom, the ratio of the silicon-bonded vinyl groups in (A) to the silicon-bonded hydrogen atoms in (B) being in the range of 1:100 to 100:1.

In addition, the above defined composition can contain a cure accelerator (C) which is a mercaptofunctional silicone.

Component (A) in the above composition can be any siloxane consisting essentially of from 0.5 to 100 mole percent of vinyl-containing siloxane units of the general formula $(CH_2=CH)R_nSiO_{3-n/2}$. These vinyl-containing siloxanes can range anywhere from low molecular weight fluids such as vinyl methyl cyclotetrasiloxane to high molecular weight gums having a molecular weight of one million or more. In the foregoing formula R can be any monovalent hydrocarbon or monovalent halogenated hydrocarbon radical. Specific examples of R include alkyl groups such as the methyl, ethyl, propyl, butyl, amyl, hexyl, decyl, dodecyl and octadecyl radicals. Alkenyl radicals such as the vinyl, allyl, hexenyl and octadecenyl radicals. Alkynyl radicals such as the propargyl radical, aryl radicals such as the phenyl and naphthyl radicals, aralkyl radicals such as the benzyl and 2-phenylethyl radicals or alkaryl radicals such as the tolyl and xylyl radicals. R can also be any of the corresponding halogenated hydrocarbon radicals such as the chloromethyl, chloropropyl, chlorophenyl, dichlorophenyl, bromopropyl, 3,3,3-trifluoropropyl, and $\alpha,\alpha,\alpha$-trifluorotolyl radicals. There can be 0, 1 or 2 R groups attached to the silicon atom; that is, $n$ can have a value from 0-2. Preferably R contains from 1 to 30 carbon atoms.

Any of the siloxane units in (A) which do not have the above unit formula will be of the general formula $R'_mSiO_{4-m/2}$. In this formula R' can be any monovalent hydrocarbon or monovalent halogenated hydrocarbon radical. Specific examples of R' are the same as those set forth for R above. There can be 0, 1, 2 or 3 R' radicals attached to the silicon atom; that is to say, $m$ can have a value from 0-3.

The second component of the composition is siloxane (B) which contains silicon-bonded hydrogen atoms. This siloxane containing silicon-bonded hydrogen atom can be linear, cyclic or branched in configuration and can be either a homopolymer or a copolymer. Siloxane (B) can be any simple or complex siloxane within reason which contains at least one SiH group per molecule. This siloxane can be a liquid or a solid although it is preferable that component (B) be in liquid form although those materials in the form of solids can be employed if they are used in solution in a suitable solvent.

In the above defined composition the ratio of the silicon-bonded vinyl groups in (A) to the silicon-bonded hydrogen atoms in (B) is in the range of 1:100 to 100:1. While more precise limitations are difficult to place on the relative amounts of (A) and (B) to be employed in the composition because of the differences in characteristics that the person employing the invention may seek, generally speaking, the lower the vinyl content per molecule in siloxane (A) the higher the amount of silicon-bonded hydrogen atoms one will employ in (B). One exception or special case that is known at this time to that general rule is when (A) is a methylvinyl cyclotetrasiloxane.

It has also been found unexpectedly that certain additives can be employed in the above composition as cure accelerators. One particularly useful group of such materials are mercaptofunctional silicones. The mercaptofunctional silicone can be either a silane or a siloxane. The term "mercaptofunctional silicone" as used herein means and is intended to include any silane or siloxane which has a mercaptan group (HS—) which is attached to a silicon atom via a silicon-to-carbon-to-sulfur bond. Illustrative of the useful mercaptofunctional silanes are those having the general formula $[(HS)_pR''']_qR''''_sSiX_{4-q-s}$. Illustrative of the mercaptofunctional siloxanes useful herein are those having the general formula $[(HS)_pR''']_qR''''_sSiO_{4-q-v/2}$.

In the foregoing formulae R''' is a di- or trivalent hydrocarbon radical in which one bond is attached to the silicon atom and in which the other bonds are occupied by the mercapto groups. There can be one or two mercapto groups attached to R'''. That is to say, $p$ can be 1 or 2. There can be from 1–18 carbon atoms in the R''' radical but preferably there are at least 3 carbon atoms present. When there are less than 3 carbon atoms then no more than one mercapto group can be attached to the R''' radical. There can be one or two of the mercaptofunctional groups [(HS)$_p$R'''] attached to each silicon atom which is to say that $q$ can have a value of 1 or 2. Most commonly $q$ will have a value of 1.

In the case of the silanes the other valences of the silicon atom are occupied by either R'''' or X groups. The R'''' group can be any monovalent hydrocarbon radical, illustrations of which can be found in the specific examples set forth with regard to R above. The X groups are hydrolyzable groups such as halogen atoms (chlorine, bromine, or iodine), alkoxy groups (methoxy, ethoxy, propoxy, butoxy, xyloxy), acyloxy groups (acetoxy, proprionoxy, hexanoyloxy), hydrocarbonoxy groups ($CH_3OCH_2CH_2O-$, $C_2H_5OCH_2CH_2O-$) or oxime groups. The $s$ can have a value from 0–3, but it is preferred that when there are R'''' radicals attached to the silicon atom there be only 1 or 2. The sum of $q$ and $s$ in the silane can be from 1–4.

In the case of the siloxane any remaining valences on the silicon atom can be occupied either by the R'''' group or the oxygen atoms. The R'''' group can be any monovalent hydrocarbon radical and is illustrated by the specific examples set forth with regard to R above. In the siloxane $v$ can have a value from 0–2 inclusive, and the sum of $q$ and $v$ can be from 1–3. Preferably $v$ has a value no greater than 1.

The mercaptofunctional siloxanes useful herein include not only homopolymers having siloxane units as set forth above but also copolymers of such siloxane units with siloxane units of the general formula $Q_tSiO_{4-t/2}$. Q can be any monovalent hydrocarbon or halogenated hydrocarbon radical which may be illustrated by the examples set forth by R' above. There can be 0, 1, 2 or 3 Q radicals attached to the silicon; that is, $t$ has a value from 0–3.

While it is not possible to set forth any exact meaningful numerical limitations on the amount of mercaptofunctional silicone to be employed as an accelerator in the above composition the following general guidelines can be given to those skilled in the art to help them decide what is the optimum amounts to be added in their particular situation. Generally speaking, as the number of mercaptofunctional siloxane units in the silicone employed increases the rate of cure increases. Similarly, as the viscosity of the mercaptofunctional silicone employed increases the rate of cure increases and finally, as a compatibility between the mercaptofunctional silicone and the siloxane-containing vinyl groups increases the cure rate tends to increase.

The second composition of this invention which is curable upon exposure to ultraviolet light consists essentially of (1) a mercaptofunctional siloxane as hereinafter defined and (2) a vinyl-containing siloxane as hereinafter defined, the ratio of the mercapto groups in (1) to the vinyl groups in (2) being in the range of 1:100 to 100:1.

In this second composition the siloxane (1) can be any mercaptofunctional siloxane consisting essentially of from 0.1 to 100 mole percent of siloxane units of the general formula $(HSR'')_y(R''')_xSiO_{4-x-y/2}$ wherein R'' is an alkylene radical containing from 1–18 carbon atoms which links the mercapto group to the silicon atom, $y$ has a value of 1 or 2, R''' is a monovalent hydrocarbon or monovalent halogenated hydrocarbon radical, $x$ has a value from 0–2, and the sum of $x + y$ is from 1–3, any non-mercapto containing siloxane units present (0 to 99.9 mole percent) having the general formula $R''''_zSiO_{4-z/2}$ wherein R'''' is a monovalent hydrocarbon or monovalent halogenated hydrocarbon radical, and $z$ has a value of 0–3.

The R'' radical in the above formula can be any alkylene radical containing from 1–18 carbon atoms. The R'' radical links the mercapto group with the silicon atom. Specific examples of R'' include the methylene, ethylene, propylene, butylene, isobutylene, hexylene, dodecylene and octadecylene radicals. There can be 1 or 2 mercaptofunctional containing groups attached to each silicon atom; i.e., $y$ has a value of 1 or 2.

In the above formula R''' is any monovalent hydrocarbon or monovalent halogenated hydrocarbon radical. Specific examples of such materials can be found within the examples given with regard to the R radical above. There can be 0, 1 or 2 R''' radicals attached to each silicon atom provided, however, that the sum of $x + y$ falls within the range of 1–3.

In the other formula set forth above the R'''' radical can be any monovalent hydrocarbon or monovalent halogenated hydrocarbon radical, and again the examples with regard to the R radical are equally applicable here. There can be 0, 1, 2 or 3 R'''' radicals attached to the silicon atom. While it should be obvious to those skilled in the art it is perhaps worth noting at this point that while one talks, for example, of there being 0, 1, 2, or 3 R'''' radicals (or other such variations with reference to radicals in the other formulae) attached to the silicon atom, it is understood that there can be combinations of units with different degrees of substitution; that is, there can be copolymers containing siloxane units having two R'''' radicals per silicon atom with units having one R'''' radical per silicon atom, or with units having three R'''' radicals per silicon atom or with both such units.

The siloxane (2) in this second composition can be any vinyl-containing siloxane of the general formula set forth above with regard to component (A).

To each of the compositions of this invention defined above there is added a photosensitizer. Such materials are well known in the art and include for example, acetophenone, propiophenone, benzophenone, xanthone, fluorenone, benzaldehyde, fluorene, anthraquinone, triphenylamine, carbazole, 3-methylacetophenone, 4-methylacetophenone, 3-pentylacetophenone, 4-methoxyacetophenone, 3-bromoacetophenone, 4-allylacetophenone, p-diacetylbenzene, 3-methoxybenzophenone, 4-methylbenzophenone, 4-chlorobenzophenone, 4,4'-dimethoxybenzophenone, 4-chloro-4'-benzylbenzophenone, 3-chloroxanthone, 3,9-dichloroxanthone, 3-chloro-8-nonylxanthone, and the like materials. The amount of such material need only be sufficient to photosensitize the system and usually will vary from 0.01 to 20 percent by weight based on the weight of the siloxanes present. Generally, it is preferred the amount be in the range of 0.1 to 5 percent.

So far as is known at this time, the above defined composition which is composed of (A) vinyl-containing siloxane and (B) siloxane containing silicon bonded hydrogen atoms can be cured by exposure to any source of ultraviolet light having a wave length of less than 3650 A. On the other hand, the composition which consists essentially of the mercaptofunctional siloxane (1) and the vinyl-containing siloxane (2) can be cured by exposure to ultraviolet light which has a wave length of 2537 A. Any ultraviolet light source which puts out the above defined wave lengths can be used to cure those compositions set forth above. Of course, it is preferred that the ultraviolet light source have those wave lengths as their major line otherwise one runs into the problem of curing the composition within a reasonable time. There are ultraviolet lamps available commercially from a number of sources which do put out ultraviolet light in the 2000–4000 Angstrom range and which have the above wave lengths as their major lines. In addition, there are a number of ways in which those utilizing the instant invention can control the cure time to meet their own specific desires and needs. For example, the cure time can be regulated by the number of ultraviolet lamps used; the dwell time, that is, the length of time which the composition is exposed to the ultraviolet light; and the distance that the composition being cured is from the ultraviolet light source.

Now, in order that those skilled in the art may better understand how the present invention can be practiced the following examples are given by way of illustration and not by way of limitation. In the examples all parts and percents are by weight and all viscosities measured at 25° C. unless otherwise specified.

EXAMPLE 1

A composition was prepared in two parts. Part A consisted essentially of 25.5% of mixture prepared by mixing 100 parts of a phenyl methyl vinyl endblocked polydimethylsiloxane having a viscosity of about 2000 cs., 8.87 parts of hexamethyldisilazane, 2.73 parts distilled water, 0.13 part of platinum, and 35.83 parts of silica; 73.0% of a mixture prepared by mixing 35 parts of a resin composed of $(CH_3)_3SiO_{1/2}$, $CH_2=CH(CH_3)_2SiO_{1/2}$ and $SiO_2$ units, the ratio of the sum of the trimethylsiloxy units and dimethylvinylsiloxy units to the $SiO_2$ units in the resin being in the range of 0.4 to 1.2:1, and 65 parts of a phenylmethylvinyl enblocked polydimethylsiloxane fluid; and 1.5% of benzophenone. Part B consisted essentially of 55% of a mixture prepared by mixing 35 parts of a resin composed of $(CH_3)_3SiO_{1/2}$, $CH_2=CH(CH_3)_2SiO_{1/2}$ and $SiO_2$ units, the ratio of the sum of the trimethylsiloxy and dimethylvinyl siloxy units to $SiO_2$ units in the resin being in the range of 0.4 to 2.1:1, and 65 parts of phenylmethylvinyl endblocked polydimethylsiloxane fluid; 40% of a trimethylsilyl endblocked methylhydrogenpolysiloxane fluid; and 5% of fluid methylvinylcyclosiloxanes.

10 parts of Part A defined above cold blended with 1 part of Part B defined above and this mixture was applied to a stainless steel panel in a thin film. The coated panel was exposed to ultraviolet light by placing it under a Hanovia U.V. lamp that has an output in the 3000–4000 A range. This was a 450 watt lamp with 27 watts in the far U.V. range and 5.8 watts at 2537 A. The panel was about 3 inches from the lamp for about 3 to 5 minutes. The cured films had a dry surface which released common transparent tape and which resists abrasion.

EXAMPLE 2

A mixture was prepared which consisted essentially of 3.23g. of a trimethylsilyl endblocked polymer composed of about 78 mole percent $(CH_3)_2SiO$ units and about 22 mole percent $CH_2=CH(CH_3)SiO$ units, 1.77g. of a trimethylsilyl endblocked polymer composed of $H(CH_3)SiO$ units, and 95g. of toluene. This mixture was coated on 40 lb. Supercalendared Kraft paper using a No. 14 Mayer rod. The coated paper was then exposed to a 450 watt U.V. lamp (27 watts far U.V., 5.8 watts at 2537 A) for 120 seconds at a distance of 2.5 inches. The temperature of the paper reached 58° C. The coating cured within this time and exhibited no smear, rub-off or migration showing it to be useful as a paper release coating.

"Rub-off" and "smear" are subjective tests used in the paper industry. They are determined by rubbing a finger tip across the coating to see if it crumbles or is removed (rub-off) or if it is uncured (smears). "Migration" is also a subjective test used in the paper industry and is conducted by placing a piece of Scotch brand cellophane tape on the coating, removing the tape, and seeing if it will then stick to itself. If it sticks no migration of the coating to the tape has taken place. If it does not stick the release coating has migrated to the adhesive.

EXAMPLE 3

A composition was prepared which consisted of equal parts of a trimethylsilyl endblocked siloxane composed of $H(CH_3)SiO$ units and trimethylsilyl endblocked siloxane composed of about 92 mole percent $(CH_3)_2SiO$ units and about 8 mole percent $CH_2=CH(CH_3)SiO$ units. To this mixture there was added 0.5% of benzophenone. The ratio of silicon bonded vinyl groups to silicon bonded hydrogen atoms was 1:1. The composition, which had a viscosity of 467 cs., was then coated onto S2S Supercalendared Kraft paper using a trailing blade at various pressures. The coating was then exposed to a U.V. lamp at a distance of about 3 inches for varying lengths of time. In all cases the coating cured to a no smear, no rub-off state. The cured coating was tested for release characteristics using Routine Control Test No. 283 of the Technical Association for the Pulp and Paper Industry which is commonly called the "Keil Test." This test is well known to those skilled in the paper release coating art and is described in detail in Tappi, Volume 43, No. 8, pages 164A–165A, August 1960. The details and results of the tests are set forth in the table below.

| Test No. | Blade Pressure (lb.) | Cure Time (sec.) | Release (g./in.) | |
|---|---|---|---|---|
| | | | Initial | Subsequent |
| 1 | 15 | 10 | 324 | 500+ |
| 2 | 20 | 10 | 335 | 500+ |
| 3 | 20 | 15 | 321 | 500+ |
| 4 | 20 | 20 | 345 | 500+ |
| 5 | 25 | 10 | 343 | 500+ |

EXAMPLE 4

A number of compositions were prepared by mixing (A) a dimethylvinylsilyl endblocked siloxane composed of about 80 mole percent $(CH_3)_2SiO$ units and about 20 mole percent $CH_2=CH(CH_3)SiO$ units, and (B) a trimethylsilyl endblocked siloxane composed of $H(CH_3)SiO$ units. In a mixture of 2g. of (A) and 0.32g. of (B) the ratio of silicon bonded vinyl groups to silicon bonded hydrogen atoms is 1:1. All samples were coated by trailing blade onto Supercalendared Karft paper, exposed to a 950 watt U.V. lamp (at about 3 inches) to cure them, and then evaluated by the Keil Test for release. The details of the compositions and test results are set forth in the following table.

| | Composition (g.) | | Blade Pressure | Cure Time | Release (g/in.) | |
|---|---|---|---|---|---|---|
| | (A) | (B) | (lb.) | (sec.) | Initial | Subsequent |
| 1 | 2.0 | 0.32 | 10 | 5 | 125 | 450 |
| 2 | 2.0 | 0.32 | 20 | 5 | 162 | 470 |
| 3 | 2.0 | 0.32 | 20 | 10 | 170 | 450 |
| 4 | 2.0 | 0.64 | 20 | 5 | 219 | 250 |
| 5 | 2.0 | 0.64 | 10 | 5 | 157 | 420 |
| 6 | 2.0 | 0.16 | 20 | 10 | 83 | 370 |
| 7 | 2.0 | 0.16 | 20 | 5 | 62 | 450 |
| 8 | 2.0 | 0.16 | 20 | 5 | 65 | 420 |
| 9 | 2.0 | 0.64 | 20 | 10 | 243 | 430 |

EXAMPLE 5

A composition was prepared by mixing 6.15g. of a mixture composed of 6 parts of cyclic methylvinylsiloxanes and 1 part of a hydroxyl endblocked siloxane gum composed of about 96 mole percent $(CH_3)_2SiO$ units and about 4 mole percent $CH_2=CH(CH_3)SiO$ units, 3.85g. of a trimethylsilyl endblocked siloxane composed of $H(CH_3)SiO$ units, and 0.15g. of benzophenone. The ratio of silicon bonded vinyl groups to silicon bonded hydrogen atoms in the composition was 1:1. This composition was coated onto 60 lb. Nicolet Kraft paper using a trailing blade coater at 15 pounds pressure. The coating on the paper was cured after 5 seconds exposure to a U.V. lamp at a distance of 3 inches.

EXAMPLE 6

A composition was prepared by mixing 8.58g. of a mixture composed of 6 parts of a dimethylvinyl endblocked polydimethylsiloxane fluid and 1 part of a hydroxyl endblocked siloxane gum composed of about 96 mole percent $(CH_3)_2SiO$ units and about 4 mole percent $CH_2=CH(CH_3)SiO$ units, 1.42g. of a trimethylsilyl endblocked siloxane composed of $H(CH_3)SiO$ units, and 0.15g. of benzophenone. The ratio of silicon bonded vinyl groups to silicon bonded hydrogen atoms in the composition was 1:1. This composition was coated onto 60 lb. Nicolet Kraft paper using a trailing blade coater at 15 pounds pressure. The coating on the paper was cured after 10 seconds exposure to a U.V. lamp at a distance of 3 inches.

EXAMPLE 7

Seven compositions were prepared in which the ratio of silicon bonded vinyl groups to silicon bonded hydrogen atoms was 4:1. In each composition the source of vinyl groups was a dimethylvinylsilyl endblocked siloxane composed of about 78 mole percent dimethylsiloxane units and about 22 mole percent methylvinylsiloxane units. In each composition a different source of hydrogen atoms was used, the specific sources being indicated below. To each composition there was also added 1.5% of benzophenone. The compositions were coated onto S2S Supercalendared Kraft paper using a 15 pound drawdown knife, and then exposed to a U.V. lamp at a distance of 3 inches to cure the composition. The minimum time needed to cure the coating to a no smear, no rub-off state is set forth in the table which follows.

| Source of Si—H | | Cure Time (seconds) |
|---|---|---|
| A | $[(CH_3)_3SiO]_2CH_3SiH$ | 30 |
| B | $-[(CH_3)_2SiO]_3[(CH_3)HSiO]-$ | 30 |
| C | $(CH_3)_3SiO[(CH_3)_2SiO]_{3x}[(CH_3)HSiO]_{1x}Si(CH_3)_3$ (1x = 25 mol %, 3x = 75 mol %) | 10 |
| D | Copolymer of 89 mol % $(CH_3)_2SiO$ and 11 mol % $H(CH_3)_2SiO$ units | 15 |
| E | $(CH_3)_3SiO[(CH_3)_2SiO]_{-3}[(CH_3)HSiO]_{-2}Si(CH_3)_3$ | 15 |
| F | $(CH_3SiO[(CH_3)HSiO]_{-10}Si(CH_3)$ | 5 |
| G | Methylhydrogencyclosiloxanes | 5 |

EXAMPLE 8

A composition was prepared which consisted essentially of 94.7 parts of a vinyldimethylsilyl endblocked siloxane composed of about 22 mole percent methylvinylsiloxane units and about 78 mole percent dimethylsiloxane units, 3.8 parts of a trimethylsilyl endblocked methylhydrogen siloxane, and 1.5 parts of benzophenone. This composition was coated on paper with a trailing blade at various pressures, and then the paper passes under U.V. lamps at various speeds to cure the coating. The results of this test are set forth in the table below.

| Test No. | Blade Pressure (lb.) | Paper Speed (ft/min) | Cure U.V. Lamps | Smear | Migration | Rub-off |
|---|---|---|---|---|---|---|
| 1 | 15 | 30 | * | Haze | Yes | No |
| 2 | 15 | 20 | * | Very slight Haze | No | No |
| 3 | 15 | 10 | * | No | No | No |
| 4 | 15 | 5 | * | No | No | No |
| 5 | 10 | 20 | * | No | Very slight | No |
| 6 | 10 | 10 | * | No | No | No |
| 7 | 15 | 30 | * | Haze | Slight | No |
| 8 | 15 | 15 | ** | Slight Haze | Very slight | No |
| 9 | 15 | 30 | *** | Slight Haze | No | No |
| 10 | 15 | 20 | *** | No | No | No |
| 11 | 10 | 20 | *** | No | No | No |

*Two Sylvania T-8 U.V. lamps
**One Sylvania T-7 U.V. lamp
***One Sylvania T-8 and One Sylvania T-7 U.V. lamp

EXAMPLE 9

The procedure of Example 13 was repeated except that Hanovia U.V. lamps were used and in addition a second composition was also used as a coating on some of the paper. This second composition consisted of 95.0 parts of a trimethylsilyl endblocked siloxane composed of about 23.3 mole percent methylvinylsiloxane units and about 76.7 mole percent dimethylsiloxane units and had the approximate general formula $Me_3SiO(Me_2SiO)_{330}$—$(MeViSiO)_{100}SiMe_3$ wherein Me and Vi, respectively, represent the methyl and vinyl radicals, 5.0 parts of a trimethylsilyl endblocked methylhydrogen siloxane, and 1.5 parts of benzophenone. The test results are set forth in the following table where the composition of Example 13 is identified as "A" and the composition set forth above is identified as "B."

a Texachrome dye was substituted for the Rhodamine B. In this case the cured silicone film did not accept the dye while the glassine paper (uncured image) accepted the dye.

EXAMPLE 11

When the vinyl containing siloxanes set forth below are substituted for the vinyl siloxanes of the preceding examples, compositions curable upon exposure to ultraviolet light in the 2000–4000A range are obtained.

1. A copolymer composed of 0.5 mole percent vinyl-

| Test No./ Composition | Blade Pressure (lb.) | Paper Speed (ft/min) | Number U.V. Lamps | Cure Smear | Migration | Rub-off |
|---|---|---|---|---|---|---|
| 1/A | 10 | 50 | 2 | Slight Haze | No | No |
| 2/A | 10 | 40 | 2 | No | No | No |
| 3/A | 10 | 30 | 2 | No | No | No |
| 4/A | 15 | 30 | 2 | No | No | No |
| 5/A | 15 | 40 | 2 | No | No | No |
| 6/A | 15 | 50 | 2 | Very Slight Haze | No | No |
| 7/A | 15 | 60 | 2 | No | No | No |
| 8/A | 15 | 70 | 2 | Very Slight | Very Slight | Yes |
| 9/A | 10 | 60 | 2 | Slight Haze | No | No |
| 10/A | 10 | 123 | 4 | Haze | No | No |
| 11/A | 15 | 123 | 4 | No | No | No |
| 12/A | 15 | 90 | 3 | No | No | No |
| 13/A | 10 | 90 | 3 | Very Slight Haze | No | No |
| 14/B | 10 | 50 | 2 | No | No | No |
| 15/B | 10 | 60 | 2 | No | No | No |
| 16/B | 10 | 70 | 2 | Slight Haze | No | No |

EXAMPLE 10

This example shows the compositions of this invention to be useful as photoresist coatings. A composition curable upon exposure to ultraviolet light was prepared in two parts. Part A consisted of a mixture of 455g. of a trimethylsilyl endblocked copolymer composed of about 10 mole percent methylvinylsiloxane units and about 90 mole percent of dimethylsiloxane units, 35g. of $CH_2=CHSi[ON=C(CH_3)(C_2H_5)]_3$ and 10g. of benzophenone. Part B consisted of a mixture of 270g. of a fluid trimethylsilyl endblocked methylhydrogensiloxane polymer and 230g. of the same trimethylsilyl endblocked copolymer composed of about 10 mole percent methylvinylsiloxane units and about 90 mole percent dimethylsiloxane units as used in part A. The composition of this example was then prepared by mixing equal amounts by weight of parts A and B.

A small amount of the above prepared composition was poured onto a 3 mil polyethylene film which had previously been exposed to a corona discharge. A uniform coating of the composition on the polyethylene film was then achieved by wiping the composition over the entire surface using a paper tissue. This technique gives a surface coating of the composition which is less than one pound per 3000 square feet of surface. A brass plate was placed over part of the uncured coating and this composite was then passed under a 2 lamp UV module at 50 ft./min. The coating under the brass plate did not cure while that which was not covered cured into a tough coating. The uncured coating was removed from the film by wiping with a pentane saturated paper tissue. Then a 1% Rhodamine B dye solution (acetone-toluene) was wiped over the entire polyethylene surface. The cured silicone film was dyed pink while the uncured image (polyethylene film) did not accept the dye.

The above procedure was repeated except that glassine paper was substituted for the polyethylene film, and silsesquioxane units, 0.5 mole percent trmethylsiloxy units and 99 mole percent dimethylsiloxane units.
2. A copolymer composed of 5 mole percent vinylmethylsiloxane units, 1 mole percent propylsilsesquioxane units and 94 mole percent dimethylsiloxane units.
3. A copolymer composed of 10 mole percent chloropropylvinylsiloxane units, 2 mole percent chloropropylmethylsiloxane units and 88 mole percent dimethylsiloxane units.
4. 100 mole percent vinylmethylcyclotetrasiloxane.
5. A copolymer composed of 10 mole percent vinylmethylsiloxane units, 4 mole percent dimethyloctadecylsiloxane units and 86 mole percent dimethylsiloxane units.
6. A copolymer composed of 80 mole percent methylvinylsiloxane units, 15 mole percent 3,3,3-trifluoropropylmethylsiloxane units and 5 mole percent trimethylsiloxy units.

EXAMPLE 12

A composition was prepared which consisted essentially of 96.1 parts of a trimethylsilyl endblocked siloxane copolymer composed of about 78 mole percent dimethylsiloxane units and about 22 mole percent methylvinylsiloxane units, 2.4 parts of a trimethylsilyl endblocked methylhydrogen-siloxane, and 1.5 parts of benzophenone.

Three additional compositions were prepared which were identical to the one above except that they contained, respectively, 0.4, 0.8 and 1.2 parts of mercaptopropyltrimethoxysilane in addition to the other components.

The above compositions were coated on paper using a trailing blade and 10 pounds of nip pressure. The coated paper was then exposed to a UV lamp at a distance of 3 inches from the source.

The first composition was not cured after 5 seconds but had cured after 15 seconds exposure to the UV lamp. The three compositions containing the mercaptofunctional silicone had all cured after 5 seconds exposure to the UV lamp.

EXAMPLE 13

When the mercaptofunctional silanes set forth below are substituted for the mercaptopropyltrimethoxysilane of the preceding example, similar results are obtained.
1. di-mercaptobutyl-di-isopropoxysilane
2. 1,6-dimercaptohexyltrichlorosilane
3. mercaptopropylphenyldiacetoxysilane
4. mercaptopropyltrimethylsilane
5. $HS(CH_2)_{12}Si[ON=C(CH_3)(C_2H_5)]_3$

EXAMPLE 14

A composition was prepared by mixing 40g. of a trimethylsilyl endblocked siloxane copolymer composed of about 80 mole percent dimethylsiloxane units and about 20 mole percent methylvinylsiloxane units, 1g. of a trimethylsilyl endblocked methylhydrogensiloxane, and 1½ percent of benzophenone.

Two additional compositions were prepared which were identical to the above except that they contained 10% and 1%, respectively, of $(CH_3)_3SiO[HSCH_2CH_2CH_2(CH_3)—SiO]_2Si(CH_3)_3$ in addition to the other components.

The above compositions were coated onto paper with a glass rod and then exposed to a UV lamp at a distance of 3 inches to cure the composition. The first composition described above cured in 10 seconds to a hazy coating which exhibited migration. The coating containing 1% mercaptofunctional silicone partially cured after 5 seconds exposure to the UV lamp. The coating containing 10% mercaptofunctional silicone cured in 10 seconds to a hazy coating which exhibited no migration.

EXAMPLE 15

When the mercaptofunctional siloxanes set forth below are substituted for the mercaptofunctional siloxane of the preceding example, similar results are obtained.
1. A copolymer composed of 5 mole percent mercaptopropylsilsesquioxane units and 95 mole percent methylethylsiloxane units.
2. A copolymer composed of 50 mole percent mercaptopropylmethylsiloxane units, 48 mole percent trifluoropropylmethylsiloxane units and 2 mole percent phenyldimethylsiloxane units.
3. A copolymer composed of 12 mole percent mercaptohexylmethylsiloxane units, 2.5 mole percent dichlorophenylsilsesquioxane units and 85.5 mole percent dimethylsiloxane units.
4. A copolymer composed of 6 mole percent mercaptopropyldimethylsiloxane units, 18 mole percent trimethylsiloxane units and 76 mole percent $SiO_4/_2$ units. Z

EXAMPLE 16

A siloxane copolymer was prepared which consisted essentially of 12.5 mole percent $CH_3SiO_3/_2$ units, 25.0 mole percent $(CH_3)_2SiO$ units, 25.0 mole percent $C_6H_5SiO_3/_2$ units, 16.67 mole percent $CH_2=CH(CH_3)SiO$ units, 16.67 mole percent $HS(CH_2)_3SiO_3/_2$ units, and 4.17 mole percent $(CH_3)_3SiO_1/_2$ units.

A two gram sample of the above siloxane was placed in an aluminum weighing dish and placed under a 450 watt ultraviolet lamp (27 watts of near U.V.). The distance between the sample and the lamp was 2 inches. After 1 minute the sample had skinned over, after 3 minutes the sample was sticky on the bottom, after 4 minutes it had cured to a rubbery state, after 5 minutes it had cured to a more brittle state, and after 10 minutes the sample had tightly cured.

The above procedure was repeated except that a small amount of azobisisobutyronitrile was added to the siloxane. This time a tight cure of the sample was obtained in 5 minutes.

EXAMPLE 17

A composition was prepared which consisted essentially of 1g. of a trimethylsilyl endblocked polymer composed of about 96 mole percent $(CH_3)_2SiO$ units and about 4 mole percent $CH_2=CH(CH_3)SiO$ units, and 1g. of a polymer composed of about 99 mole percent of $(CH_3)_2SiO$ units and about 1 mole percent of $HS(CH_2)_3SiO_3/_2$ units, and a small amount of azobisisobutyronitrile. This composition was coated on 40 lb. Supercalendared Kraft paper, and then the paper was exposed to a 250 watt U.V. lamp (35 watts at 2537 A) for 360 seconds at a distance of about 2 inches. The coating cured within this time to a no smear, no rub-off state.

EXAMPLE 18

A composition was prepared which consisted essentially of 1g. of a trimethylsilyl endblocked polymer composed of about 96 mole percent $(CH_3)_2SiO$ units and about 4 mole percent $CH_2=CH(CH_3)SiO$ units, and 1g. of a polymer composed of about 96 mole percent $(CH_3)_2SiO$ units and about 4 mole percent $HS(CH_2)_3SiO_3/_2$ units. This composition was coated on 40 lb. Supercalendared Kraft paper, and then the paper exposed to a 450 watt U.V. lamp (5.8 watts at 2537 A) at a distance of 2 inches. The temperature of the paper reached 80° C. after a 5 second exposure the coating had cured to a no rub-off, slightly smeary stage. After a 10 second exposure the coating had cured to a no rub-off, no smear stage.

EXAMPLE 19

A composition was prepared by mixing equal parts of a trimethylsilyl endblocked polymer composed of about 90 mole percent $(CH_3)_2SiO$ units and about 10 mole percent $CH_2=CH(CH_3)SiO$ units, and a polymer composed of about 93.3 mole percent of $(CH_3)_2SiO$ units and about 6.7 mol percent of $HS(CH_2)_3SiO_3/_2$ units. This composition, having a viscosity of about 1148 cs., was coated on 40 lb. Supercalendared Kraft paper with a glass rod. The coated paper was then exposed to a 450 watt U.V. lamp (5.8 watts at 2537 A) for 5 seconds at a distance of 2 inches. The temperature of the paper reached 70° C. The coating cured within this time to a no smear, no rub-off stage.

A second composition was prepared which was identical to the one above except that 2 parts of the vinyl containing siloxane polymer was mixed with 1 part of the mercaptofunctional silocane polymer. This composition, having a viscosity of about 1750 cs., was coated on paper and exposed to U.V. light as above. The coating cured to a no smear, no rub-off stage after a 10 second exposure.

EXAMPLE 20

Two polymers were prepared. One was a trimethylsilyl endblocked siloxane composed of about 90 mole percent polydimethylsiloxane units and about 10 mole percent polymethylvinylsiloxane units. The other was a trimethylsilyl endblocked siloxane composed of about 93.3 mole percent polydimethylsiloxane units and about 6.7 mole percent polymercaptopropylmethylsiloxane units. Equal parts of these two polymers were mixed and then coated (about 0.006 mm or 20 mils thick) onto Supercalendared Kraft (S2S) paper using a glass rod. In this coating mixture the mole ratio of vinyl groups to mercapto groups is 1.53:1. The coated paper was exposed to U.V. light (5 inches from the lamp) and cured fully to a no smear, no rub-off, no migration state in 5 seconds.

EXAMPLE 21

When the mercaptofunctional siloxanes set forth below are substituted for the mercaptofunctional siloxanes of Examples 16–20, compositions curable upon exposure to ultraviolet light in the 2000–4000A range are obtained.
1. A copolymer composed of 4 mole percent mercaptobutyldimethylsiloxane units and 96 mole percent trifluoropropylmethylsiloxane units.
2. A copolymer composed of 1 mole percent octadecyldimethylsiloxane units, 96 mole percent dimethylsiloxane units and 3 mole percent di-mercaptopropylsiloxane units.
3. A copolymer composed of 5 mole percent mercaptooctadecyldimethylsiloxane units and 95 mole percent mercaptopropylmethylsiloxane units.

That which is claimed is:

1. A composition, curable upon exposure to ultraviolet light, which consists essentially of
    A. a siloxane consisting essentially of from 0.5 to 100 mole percent of vinyl containing siloxane units of the general formula $(CH_2=CH)R_nSiO_{(3-n/2)}$ wherein R is a monovalent hydrocarbon or monovalent halogenated hydrocarbon radical and $n$ has a value from 0 to 2, any non-vinyl containing siloxane units present having the general formula $R'_mSiO_{(4-m/2)}$ wherein R' is a monovalent hydrocarbon or monovalent halogenated hydrocarbon radical and $m$ has a value from 0 to 3,
    B. a siloxane containing at least one silicon bonded hydrogen atom,
the ratio of silicon bonded vinyl groups in (A) to the silicon bonded hydrogen atoms in (B) being in the range of 1:100 to 100:1, and (C) a photosensitizing amount of 0.01 to 20 percent by weight a photosensitizer.

2. A composition as defined in claim 1 wherein R contains from 1 to 30 carbon atoms, and R' contains from 1 to 30 carbon atoms.

3. A composition as defined in claim 2 wherein $n$ has an average value of about 1, and $m$ has an average value of about 2.

4. A composition as defined in claim 3 wherein R is selected from the group consisting of the methyl, ethyl, phenyl, chloropropyl and 3,3,3-trifluoropropyl radicals, and R' is selected from the group consisting of the methyl, ethyl, phenyl, chloropropyl and 3,3,3-trifluoropropyl radicals.

5. A composition as defined in claim 4 wherein R is a methyl radical and R' is a methyl radical.

6. A composition as defined in claim 5 wherein siloxane (A) is composed of 100 mole percent of the vinyl containing siloxane units.

7. A composition as defined in claim 1 wherein siloxane (A) is a trimethylsilyl endblocked siloxane composed of vinylmethylsiloxane units and dimethylsiloxane units, and siloxane (B) is a trimethylsilyl endblocked methylhydrogensiloxane.

8. A composition as defined in claim 1 wherein siloxane (A) is a vinyldimethylsilyl endblocked siloxane composed of vinylmethylsiloxane units and dimethylsiloxane units, and siloxane (B) is a trimethylsilyl endblocked methylhydrogensiloxane.

9. A composition as defined in claim 1 wherein siloxane (A) is a mixture of vinylmethylcyclosiloxanes, and siloxane (B) is a trimethylsilyl endblocked methylhydrogensiloxane.

10. A composition as defined in claim 1 which also contains (D) a mercaptofunctional silicone in an amount sufficient to accelerate the cure of the composition.

11. A composition as defined in claim 10 wherein (D) is a silane having the general formula $[(HS)_pR''']_q—R''''_sSiX_{4-q-s}$ wherein R''' is a divalent or trivalent hydrocarbon radical one bond of which is attached to the silicon atom and the other bonds are attached to the mercapto groups, $p$ has a value of 1 when R''' is divalent and a value of 2 when R''' is trivalent, $q$ has a value of 1 or 2, R'''' is a monovalent hydrocarbon radical, $s$ has a value from 0–3, X is a hydrolyzable group, and the sum of $q$ and $s$ is from 1 to 4.

12. A composition as defined in claim 11 wherein R''' is a propylene radical, $p$ is 1, $q$ is 1, $s$ is 0, and X is a methoxy group.

13. A composition as defined in claim 10 wherein (D) is a siloxane having the general formula $[(HS)_pR''']_qR''''_sSiO_{(4-q-v/2)}$ wherein R''' is a divalent or trivalent hydrocarbon radical one bond of which is attached to the silicon atom and the other bonds are attached to the mercapto groups, $p$ has a value of 1 when R''' is divalent and a value of 2 when R''' is trivalent, $q$ has a value of 1 or 2, R'''' is a monovalent hydrocarbon radical, $v$ has a value from 0–2, and the sum of $q$ and $v$ is from 1 to 3, any other siloxane units present in (D) having the general formula $Q_tSiO_{(4-t/2)}$ wherein Q is a monovalent hydrocarbon or monovalent halogenated hydrocarbon radical, and $t$ has a value from 0–3.

14. A composition as defined in claim 13 wherein R''' is a propylene radical, $p$ is 1, $q$ is 1, R'''' is a methyl radical, $v$ is 1, Q is a methyl radical, and $t$ is 3.

15. A composition, curable upon exposure to ultraviolet light, which consists essentially of
    1. a siloxane consisting essentially of from 0.1 to 100 mole percent of mercaptopropylsilsesquioxane units, any other siloxane units present in (1) being methylsilsesquioxane, propylsilsesquioxane, dimethylsiloxane and trimethylsiloxane units, and
    2. a mixture of vinylmethylcyclosiloxanes, the ratio of the mercapto groups in (1) to the vinyl groups in (2) being in the range of 1:100 to 100:1, and (3) a photosensitizing amount of 0.01 to 20 percent by weight of a photosensitizer.

16. A composition, curable upon exposure to ultraviolet light, which consists essentially of
    1. a siloxane consisting essentially of from 0.1 to 100 mole percent of mercaptopropylsilsesquioxane units, any other siloxane units present in (1) being propylsilsesquioxane, dimethylsiloxane and trimethylsiloxane units, and
    2. a mixture of vinylmethylcyclosiloxanes, the ratio of the mercapto groups in (1) to the vinyl groups in (2) being in the range of 1:100 to 100:1, and (3) a photosensitizing amount of 0.01 to 20 percent by weight of a photosensitizer.

* * * * *

UNITED STATES PATENT AND TRADEMARK OFFICE
CERTIFICATE OF CORRECTION

PATENT NO. : 4,064,027
DATED : December 20, 1977
INVENTOR(S) : GEORGE A. L. GANT It is certified that error appears in the above-identified patent and that said Letters Patent are hereby corrected as shown below:

Column 1, line 34, after "It has" insert --also--.

Column 6, line 29, after "and" insert --a--.

Column 8, first table, line F, the formula should read
-- $(CH_3)_3SiO[(CH_3)HSiO]_{\sim 10}Si(CH_3)$ --.

Column 8, line 42, the word "passes" should read --passed--.

Column 11, line 59, after the word "units." delete --Z--.

Column 12, line 64, the word "silocane" should read --siloxane--.

Column 14, line 19, the formula should read
-- $[(HS)_pR''']_qR''''_sSiX_{4-q-s}$ --.

Signed and Sealed this

Twentieth Day of February 1979

[SEAL]

Attest:

RUTH C. MASON
Attesting Officer

DONALD W. BANNER
Commissioner of Patents and Trademarks